(12) United States Patent
Shimazaki et al.

(10) Patent No.: US 6,986,412 B2
(45) Date of Patent: Jan. 17, 2006

(54) TUNED CRADLE TYPE DAMPING DEVICE

(75) Inventors: Yoji Shimazaki, Shibuya-ku (JP); Morio Obata, Minato-ku (JP); Wataru Morijiri, Minato-ku (JP)

(73) Assignees: Tokai University Educational Systems, Tokyo (JP); Nippon Comsys Corporation, Tokyo (JP)

( * ) Notice: Subject to any disclaimer, the term of this patent is extended or adjusted under 35 U.S.C. 154(b) by 0 days.

(21) Appl. No.: 10/795,284

(22) Filed: Mar. 9, 2004

(65) Prior Publication Data

US 2005/0051401 A1 Mar. 10, 2005

(30) Foreign Application Priority Data

Sep. 9, 2003 (JP) .............................. 2003-317077

(51) Int. Cl.
*F16F 15/03* (2006.01)
(52) U.S. Cl. ...................... 188/267; 188/378; 248/638; 52/167.6
(58) Field of Classification Search ................ 267/136, 267/137, 140.11; 248/636, 638, 560, 562, 248/566, 584; 74/574, 604; 52/167.5, 167.6, 52/167.8; 188/378, 267, 267.2, 156, 161, 188/163, 164
See application file for complete search history.

(56) References Cited

U.S. PATENT DOCUMENTS 2,272,189 A * 2/1942 De Pew ....................... 74/604
5,713,163 A * 2/1998 Mutaguchi et al. ........ 52/167.1

FOREIGN PATENT DOCUMENTS

| EP | 0586701 A1 * | 3/1994 |
| JP | 05-256048 | 5/1993 |
| JP | 9264379 A * | 10/1997 |

* cited by examiner

*Primary Examiner*—Melody M. Burch

(74) *Attorney, Agent, or Firm*—Oliff & Berridge, PLC (57) ABSTRACT

A tuned cradle type damping deice which can be tuned with low-order (e.g., 1 Hz or lower) vibration, and exhibits higher performance for maintenance and inspection with a simple constitution than a conventional one. This tuned cradle type damping device comprises: a support having a circular-arc support surface which is at least a part of a circle; two swings positioned on both outsides of a center axis extending direction of the circular-arc support surface of the support; and two rollers which are rotatably supported on the circular-arc support surface to be rolled thereon and moved around the center axis thereof, and both ends of which are rotatably connected to the two swings to support the two swings.

2 Claims, 9 Drawing Sheets

TUNED CRADLE TYPE DAMPING DEVICE

BACKGROUND OF THE INVENTION

1. Field of the Invention

The present invention relates to a tuned swing type damping device whose mass is swung in tune with shaking of a structure caused by earthquakes, winds, passing vehicles and the like to absorb vibration energy thereof, and more particularly, to a tuned cradle type damping device which has a circular-arc support surface.

2. Description of the Related Art

Regarding structures, there are fixed structures such as buildings, bridges, towers, chimneys, tanks, floodgates and dams, and mobile structures such as ships, aircrafts and vehicles order to deal with shaking of such a structure, which is caused by forces of earthquakes, winds, passing vehicles or the like, there is known a damping device which installs a liquid or mechanical vibration source having weight of 1% or higher of mass of the structure therein, and damps the shaking by tuning shaking of the liquid or mechanical vibration source with the structure, e.g., in Japanese Patent Laid-Open No. Hei 5-256048 or the like.

The above described tuning means coincidence of an intrinsic frequency of the structure with that of the liquid or mechanical vibration source. The vibration source is swung simultaneously with the shaking of the structure to absorb vibration energy thereof. Generally, however, the liquid vibration source needs leakage prevention, and the mechanical vibration source is complex in structure. Consequently, it has not been easy to maintain the conventional damping device always operable by maintenance and inspection.

SUMMARY OF THE INVENTION

The present invention has been made with the foregoing problems in mind, and it is an object of the present invention to provide a damping device which can be tuned especially for low-order (e.g., 1 Hz or lower) vibration, and exhibits higher performance for maintenance and inspection with a simple constitution than a conventional one.

In order to advantageously achieve the object, a tuned cradle type damping device of the present invention comprises: a support having a circular-arc support surface which is at least a part of a circle; two swings positioned on both outsides of a center axis extending direction of the circular-arc support surface of the support; and two rollers which are supported on the circular-arc support surface to be rolled thereon and moved around the center axis thereof, and both ends of which are rotatably connected to the two swings to support the two swings.

According to the tuned cradle type damping device, when the support is shaken in a direction which intersects the extending direction of the center axis of the circular-arc support surface, the two swings supported at two points on the circular-arc support surface of the support are swung in tune through the two rollers and the two rollers are rolled in tune to absorb vibration energy of the support. Besides, the damping device has a very simple constitution, in which the swings are arranged on both sides of the support, and the two rollers extending between the swings are supported on the circular-arc support surface of the support.

Thus, according to the tuned cradle type damping device of the present invention, it is possible to effectively protect the structure from vibration brought about by earthquakes, winds, vehicles or the like, and to maintain the device always operable with easy maintenance and inspection.

Further, according to the tuned cradle type damping device of the present invention, since the rollers and the swings are separately disposed, the rollers can be made thinner and the swings can be made heavier, and especially the device can be effectively tuned for low-order (e.g., 1 Hz or lower) vibration.

According to the tuned cradle type damping device of the present invention, the support may have the two circular-arc support surfaces in which the center axes thereof being in parallel with each other, and the two rollers may be arranged on the two circular-arc support surfaces. Thus, swing-enabled distances are increased even if the circular-arc support surfaces are equal i.e. not enlarged in radius, thus enabling further improvement of damping effects.

According to the tuned cradle type damping device of the present invention, copper plates may be arranged on the support opposite to the two swings respectively while being individually spaced from the two swings, and the permanent magnets may be disposed in the surfaces of the two swings, which face the copper plates. Thus, since magnetic lines of force out of each permanent magnet of the swing are moved while being blocked by the copper plate, the swing are braked by an electromagnetic force. Accordingly, damping effects can be improved more.

Regarding materials for the swings in the tuned cradle type damping device of the present invention, metals such as copper and aluminum, high polymer substances such as rubber and plastic, and other substances can be used. The swings can be formed into any shapes such as rectangular or circular plate shapes, but simple shapes are preferred for calculating moment of inertia. Additionally, regarding materials for the circular-arc support surface of the support, metals such as copper and aluminum, high polymer substances such as rubber and plastic, and other substances can be used. In consideration of friction with the rollers, however, the substance of the surface is preferably selected so that vibration of the structure can be damped as quickly as possible.

BRIEF DESCRIPTION OF THE DRAWINGS

FIGS. 7A to 7D are sectional views showing the damping device of the second embodiment: FIG. 7A shows a section cut along a A1—A1 line of FIG. 7B; FIG. 7B shows a section cut along a B1—B1 line of FIG. 7A; FIG. 7C shows a section cut along a C1—C1 line of FIG. 7B; and FIG. 7D shows a section cut along a D1—D1 line of FIG. 7A.

FIGS. 10A to 10D are sectional views showing the damping device of the third embodiment: FIG. 10A shows a section cut along a A2—A2 line of FIG. 10B; FIG. 10B shows a section cut along a B2—B2 line of FIG. 10A; FIG. 10C shows a section cut along a C2—C2 line of FIG. 10B; and FIG. 10D shows a section cut along a D2—D2 line of FIG. 10A.

DETAILED DESCRIPTION OF THE PREFERRED EMBODIMENTS

Figure 1:
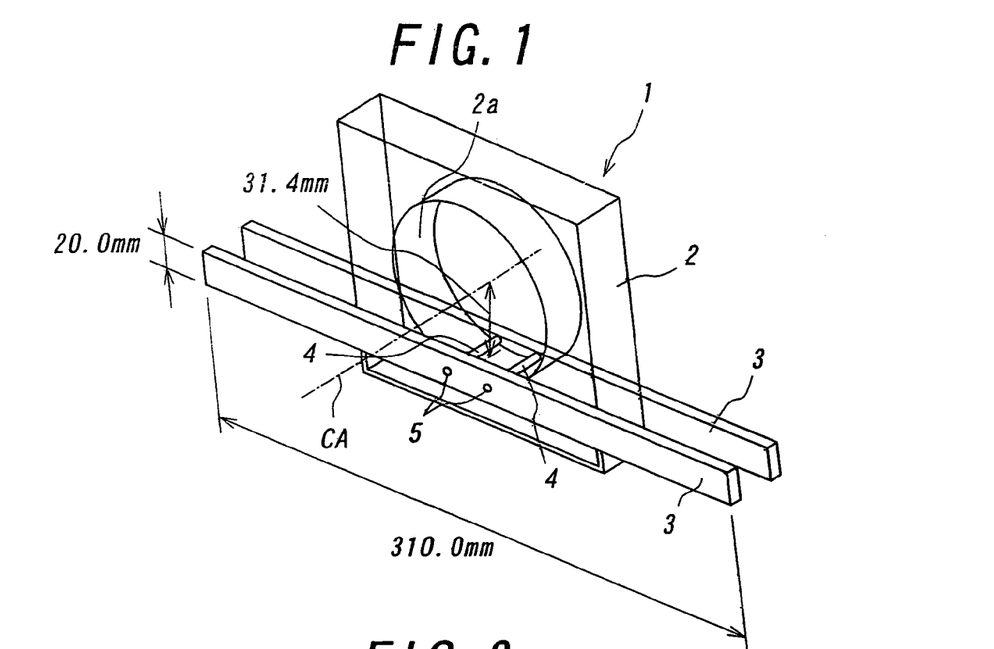
FIG. 1 is a perspective view schematically showing a first embodiment of a damping device of the present invention.
Figure 2:
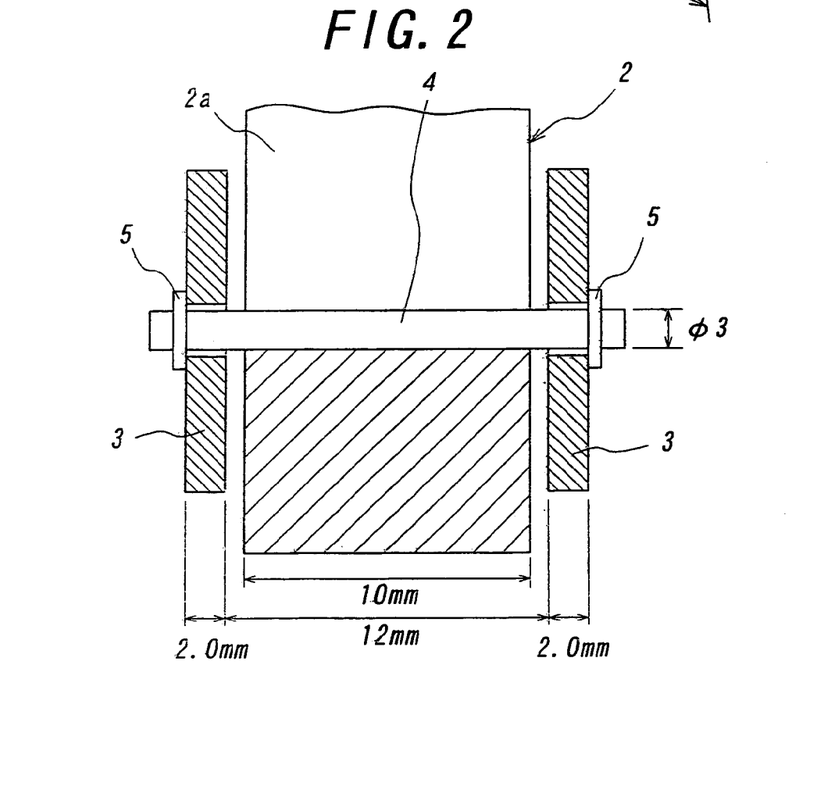
FIG. 2 is a sectional view cut along a vertical plane of a lower part of the damping device of the first embodiment, the vertical plane including a center axis of a circular-arc support surface.
Figure 3:
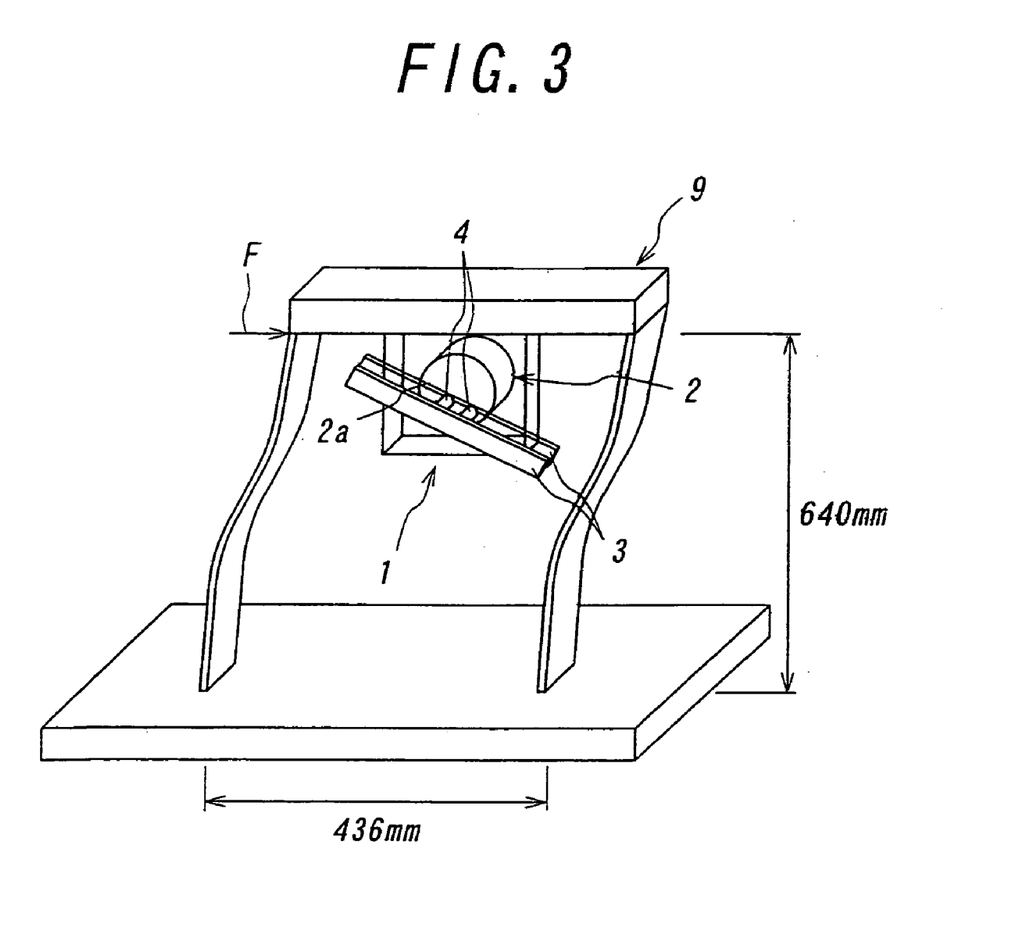
FIG. 3 is a conceptual diagram showing the damping device of the first embodiment, which is installed in a structure.
Figure 4A:
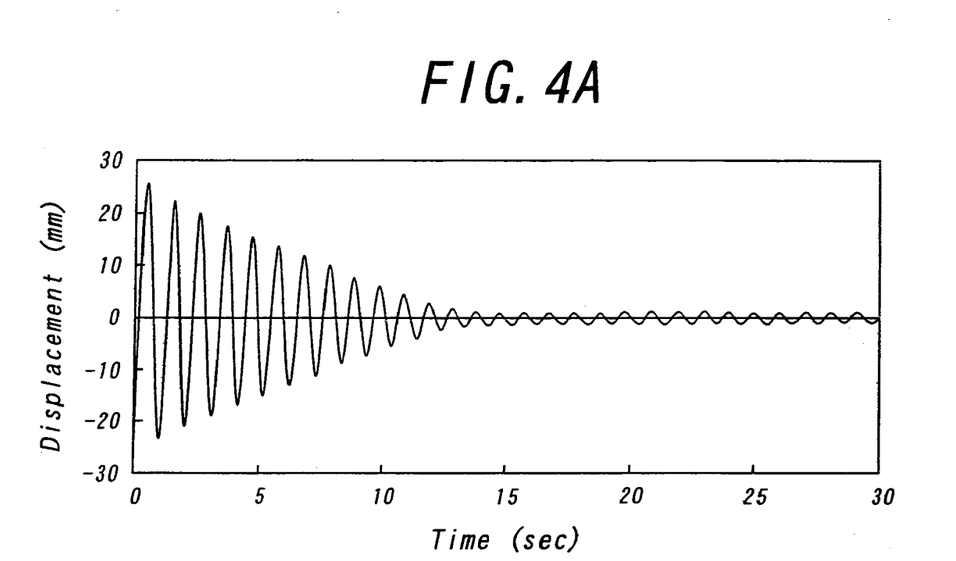
FIGS. 4A and 4B are characteristic diagrams showing vibration damping states when the damping device of the first embodiment is present and when the damping device is not present, respectively.
Figure 4B:
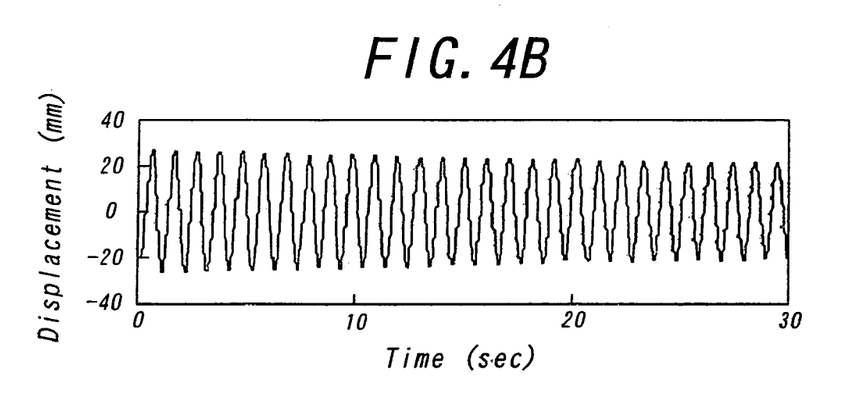

Next, embodiments of the present invention will be described with reference to the accompanying drawings. FIG. 1 is a perspective view schematically showing a first embodiment of a turned cradle type damping device of the present invention; FIG. 2 is a sectional view cut along a vertical plane of a lower part of the damping device of the first embodiment, the vertical plane including a center axis of a circular-arc support surface; FIG. 3 is a conceptual diagram showing the damping device of the first embodiment, which is installed in a structure; and FIGS. 4A and 4B are characteristic diagrams showing vibration doping states when the damping device of the first embodiment is present and when the damping device is not present, respectively.

The damping device of the first embodiment, which is denoted by a reference numeral 1 in the drawing comprises; a support 2 having a circular-arc support surface 2a which constitutes a cylindrical surface as a whole; two swings 3 positioned on both outsides of the circular-arc support surface 2a of the support 2 with respect to an extending direction of a center axis (CA) of the circular-arc support surface 2a; and two rollers 4 which are supported on the circular-arc support surface 2a to be rolled thereon and moved around the center axis CA thereof, and both ends of which are rotatably connected to the two swings 3 to support the two swings.

Incidentally, according to the first embodiment, as illustrated, the support 2 is made of an acrylic plate of 10 mm in thickness, the circular-arc support surface 2a is made of a cylindrical surface of 31.4 mm in radius, the two swings 3 are made of rectangular aluminum plates of 20.0 mm by 310.0 mm and 2.0 mm in thickness, and the two rollers 4 have steel shafts of 3.0 mm in diameter. Both ends of each roller 4 are inserted with play into the two swings 3 so as to be rotated, and then C rings 5 are fixed to the both ends outside the swings 3, thus preventing the roller 4 from falling off.

According to the tuned cradle type damping device of the first embodiment, when the support 2 is shaken in a direction which intersects the extending direction of the center axis CA of the circular-arc support surface 2a, the two swings 3 supported at two points on the circular-arc support surface 2a of the support 2 are swung in tune with the two rollers 4 interposed therebetween. The two rollers 4 are rolled in tune by friction with the circular-arc support surface 2a to absorb vibration energy of the support 2. Besides, the damping device has a very simple constitution, in which the swings 3 are arranged on both sides of the support 2, and the two rollers 4 extending between the swings 3 are supported on the circular-arc support surface 2a of the support 2.

Thus, according to the damping device of the first embodiment, it is possible to effectively protect the structure from vibration brought about by earthquakes, winds, vehicles or the like, and to maintain the device always operable with easy maintenance and inspection.

Further, according to the damping device of the first embodiment, since the rollers 4 and the swings 3 are separately disposed, the rollers 4 can be made thinner and the swings 3 can be made heavier. Thus, especially the device can be effectively tuned for low-order (e.g., 1 Hz or lower) vibration.

FIG. 4A shows a result of a vibration experiment, in which the damping device 1 of the first embodiment is attached to a center of a frame structure 6 as shown in FIG. 3, a horizontal load F is applied to an upper horizontal beam of the structure 6, and the load is removed in an elastically deformed state of the structure 6. FIG. 4B shows a result of a vibration experiment, in which, in the same structure 6, a horizontal load F is similarly applied to the upper horizontal beam without attaching the damping device 1, and the load is removed in an elastically deformed state of the structure 6.

As apparent from FIGS. 4A and 4B, large vibration is absorbed in about 15 seconds when the damping device 1 is attached. However, vibration is hardly damped even after a passage of 30 seconds, when the damping device 1 is not attached, and large vibration continues. This result apparently shows that the damping device 1 of the first embodiment has a large damping effect.

Figure 5:
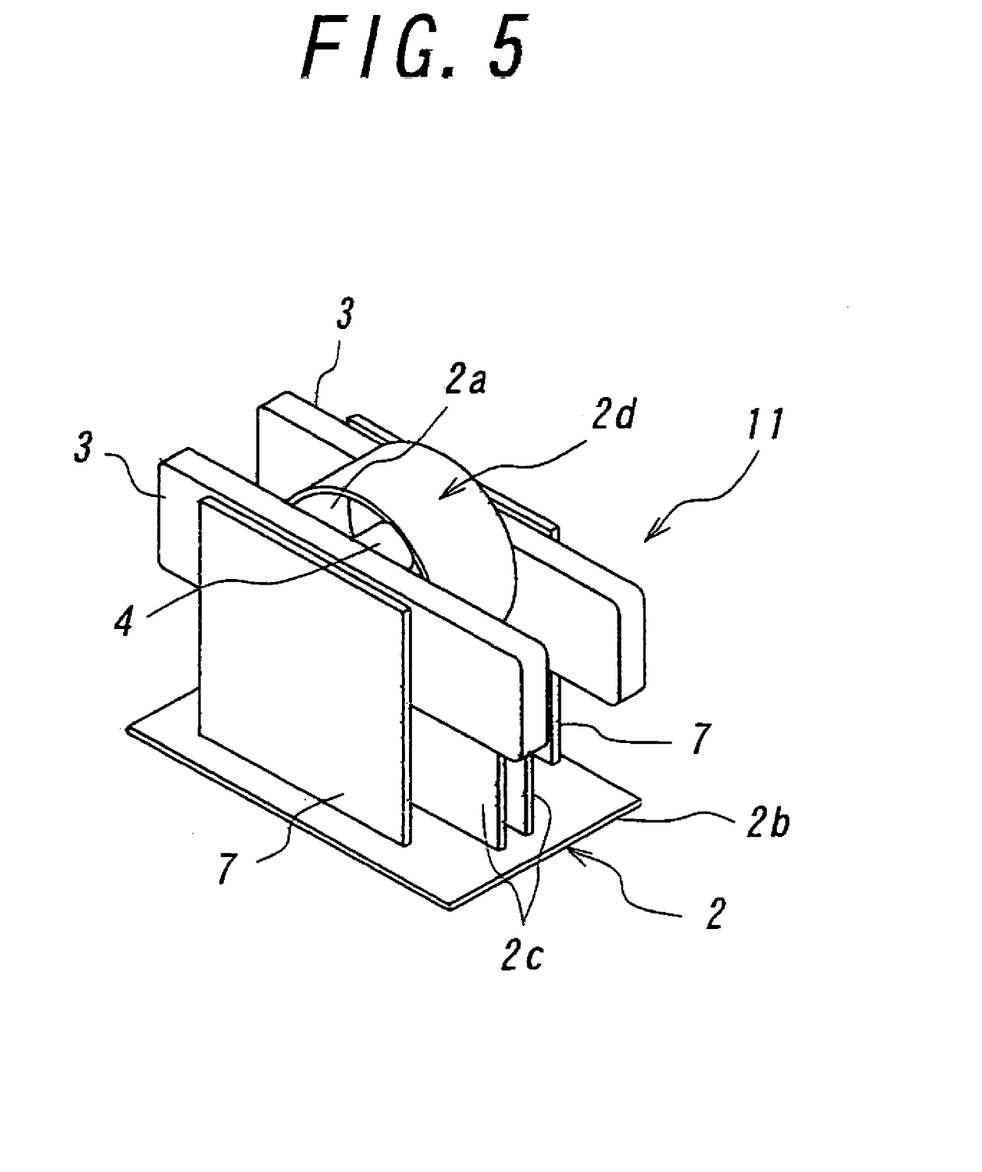
FIG. 5 is a perspective view schematically showing a second embodiment of the damping device of the present invention.
Figure 6:
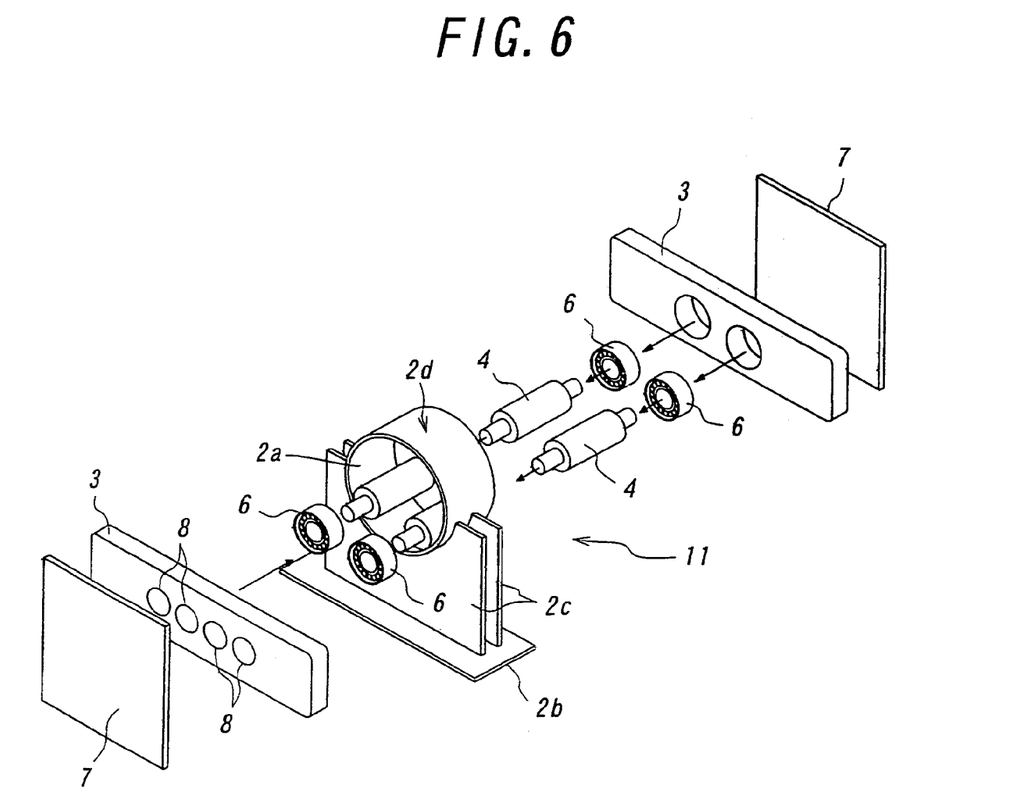
FIG. 6 is an exploded perspective view showing a structure of the damping device of the second embodiment.
Figure 7A:
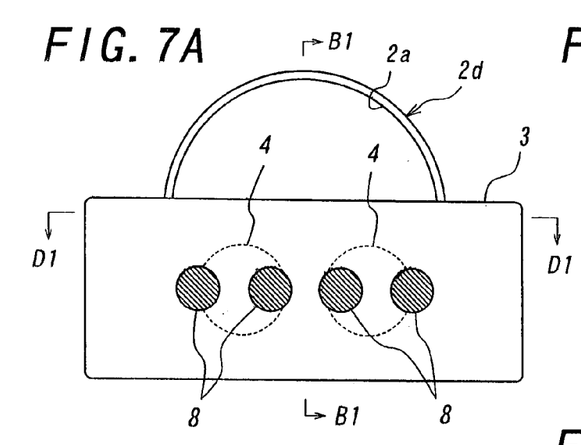
Figure 7B:
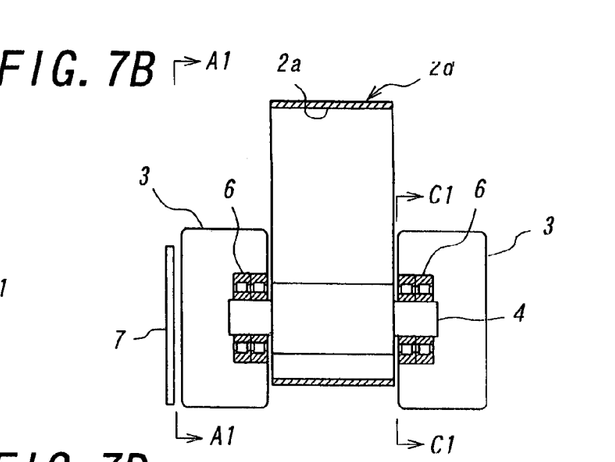
Figure 7C:
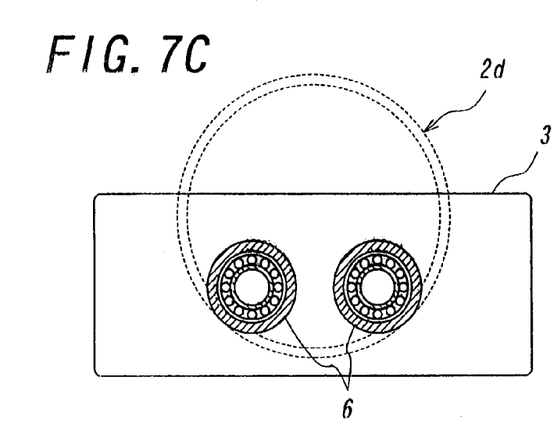
Figure 7D:
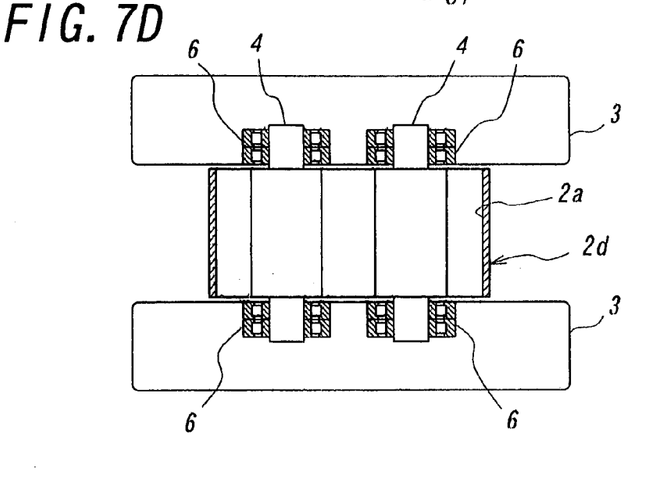

FIG. 5 is a perspective view schematically showing a second embodiment of the tuning cradle damping device of the present invention; FIG. 6 is an exploded perspective view showing a structure of the damping device of the second embodiment; FIGS. 7A to 7D are sectional views showing the damping device of the second embodiment: FIG. 7A showing a section cut along a A1—A1 line of FIG. 7B; FIG. 7B showing a section cut along a B1—B1 line of FIG. 7A; FIG. 7C showing a section cut along a line C1—C1 of FIG. 7B; and FIG. 7D showing a section cut along a line D1—D1 of FIG. 7A. In the drawings, sections similar to those of the previous embodiment are denoted by similar reference numerals.

The damping device of the second embodiment denoted by a reference numeral 11 in the drawing comprises: a support 2 having a circular-arc support surface 2a which constitutes a cylindrical surface as a whole; two swings 3 positioned on both outsides of a center axis (CA) extending direction of the circular-arc support surface 2a of the support 2; and two rollers 4 which are supported on the circular-arc support surface 2a to be rolled thereon and moved around the center axis CA thereof, and both ends of which are rotatably connected to the two swings 3 to support the two swings.

According to the second embodiment, as illustrated, the support 2 is constituted in such a manner that two support plates 2c are erected on a fixing base 2b, a cylindrical roller outer shell 2d having the circular-arc support surface 2a which forms a cylindrical surface as a whole inside is fixedly supported by the support plates 2c. Both ends of the two rollers 4 are pressed into bearings 6 embedded in the swings 3, and the rollers 4 are rotatably connected to the swings 3 through the bearings 6.

Further, according to the damping device of the second embodiment, copper plates 7 are erected on the support 2 opposite to the two swings 3 respectively while being individually spaced from the two swings 3, and four permanent magnets 8 are disposed on each of surfaces of the two swings 3 which confront the copper plates 7 (permanent magnets 8 of the deep side swing 3 are not shown in FIG. 6).

According to the tuned cradle type damping device of the second embodiment, operation and effects similar to those of the first embodiment can be obtained, and besides, since swinging of the swing 3 is accompanied by movement of magnetic lines of force out of each permanent magnet 8 of the swing 3 while being blocked by the copper plate 7, the swing 3 is braked by an electromagnetic force. Accordingly, damping effects can be improved more.

Figure 8:
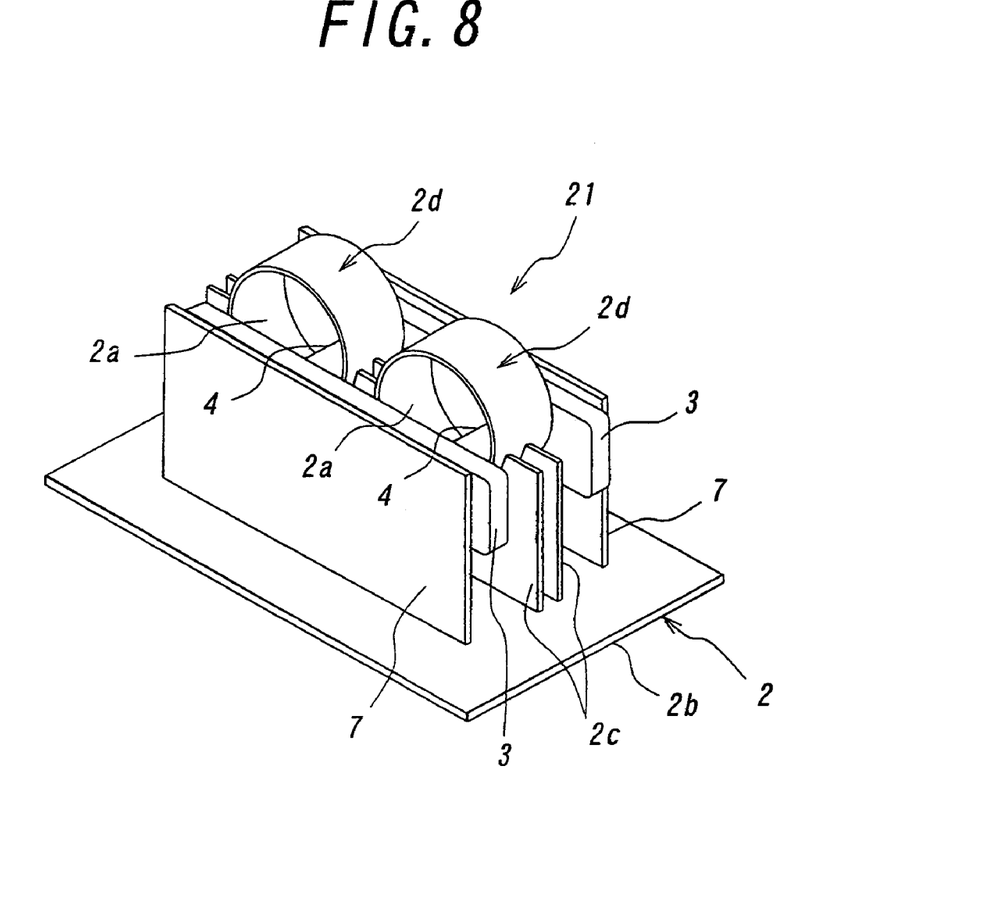
FIG. 8 is a perspective view schematically showing a third embodiment of the damping device of the present invention.
Figure 9:
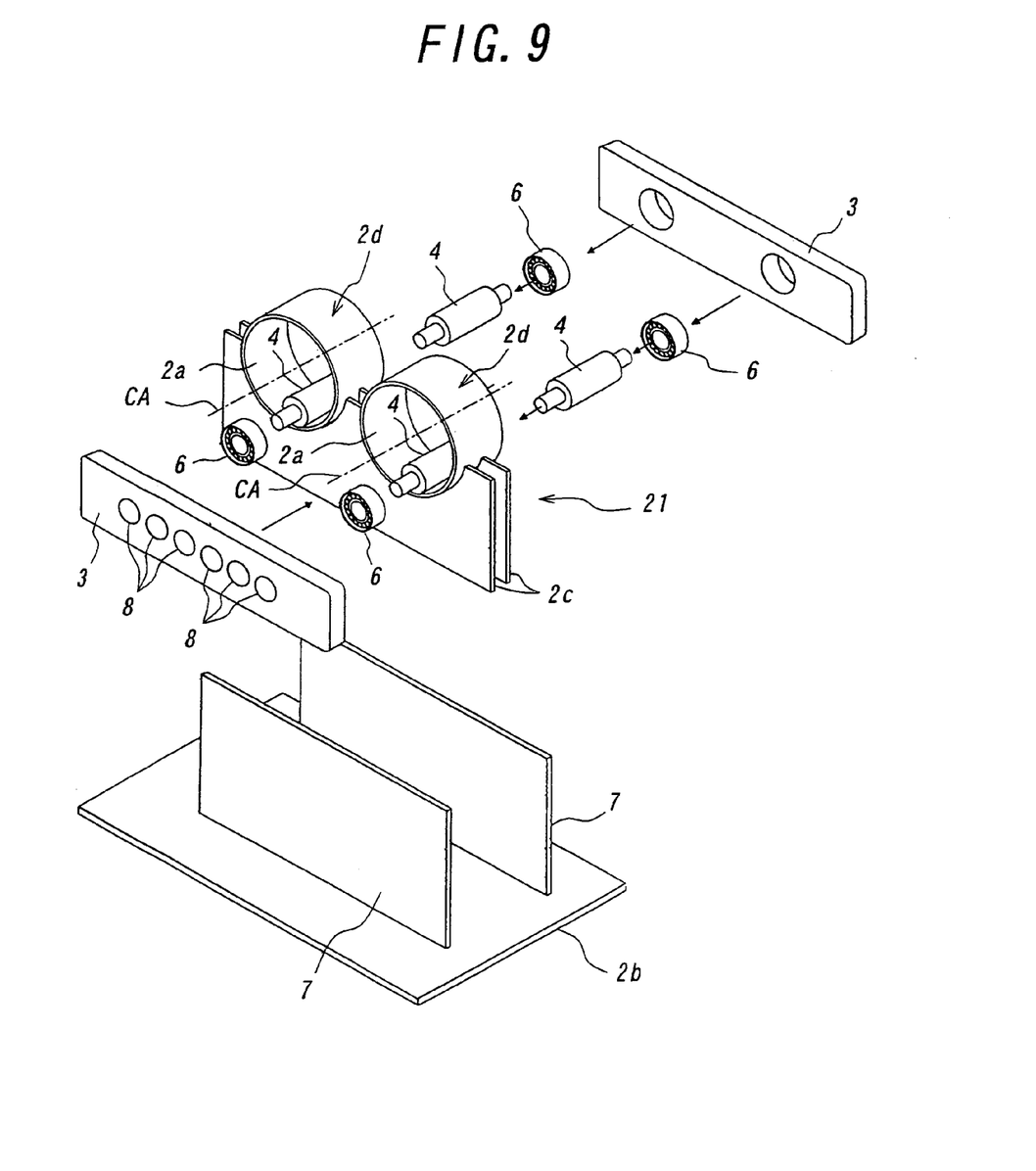
FIG. 9 is an exploded perspective view showing a structure of the damping device of the third embodiment.
Figure 10A:
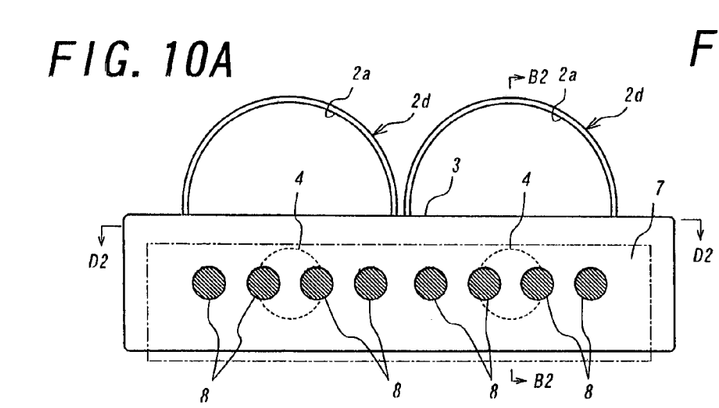
Figure 10B:
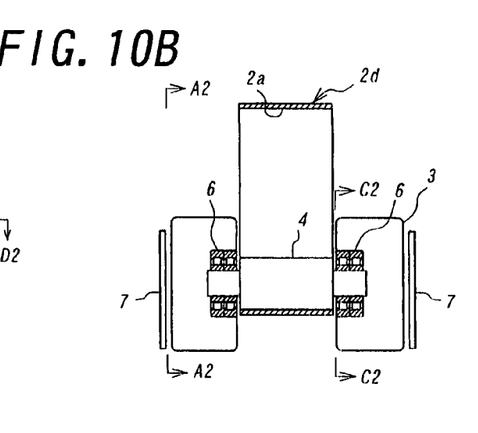
Figure 10C:
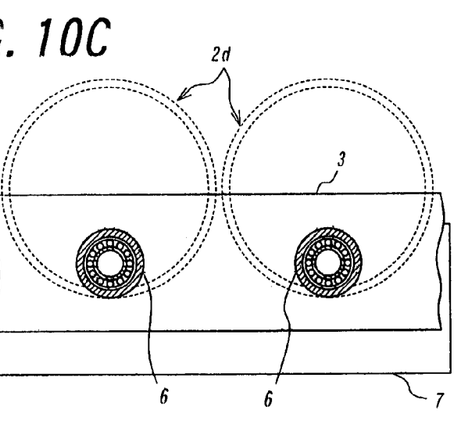
Figure 10D:
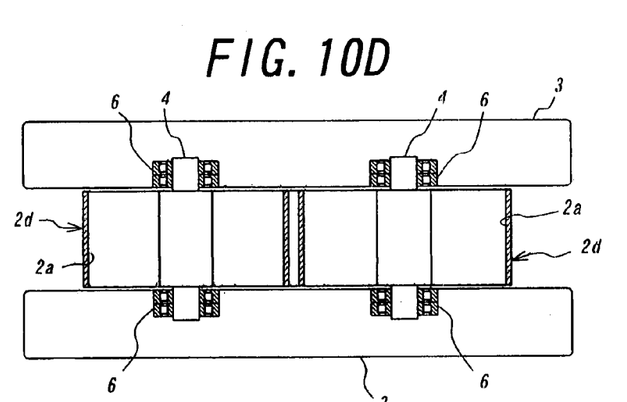

FIG. 8 is a perspective view schematically showing a third embodiment of the damping device of the present invention; FIG. 9 is an exploded perspective view showing a structure of the damping device of the third embodiment; and FIGS. 10A to 10D are sectional views showing the damping device of the third embodiment: FIG. 10A showing a section cut along a A2—A2 line of FIG. 10B; FIG. 10B showing a section cut along a B2—B2 line of FIG. 10A; FIG. 10C showing a section cut along a C2—C2 line of FIG. 10B; and FIG. 10D showing a section cut along a D2—D2 line of FIG. 10A. In the drawings, sections similar to those of the previous embodiments are denoted by similar reference numerals.

The damping device of the third embodiment, which is denoted by a reference numeral 21 in the drawing, comprises a support 2 having two circular-arc support surfaces 2a each of which constitutes a cylindrical surface as a whole; two swings 3 positioned on both outsides of center axes (CA) extending direction of the circular-arc support surfaces 2a of the support 2; and two rollers 4 which are supported on the circular-arc support surfaces 2a to be rolled thereon and moved around the center axes CA thereof, and both ends of which are rotatably connected to the two swings 3 to support the two swings 3.

According to the third embodiment, as illustrated, the support 2 is constituted in such a manner that two cylindrical roller outer shell 2d each having a circular-arc support surface 2a which forms a cylindrical surface as a whole are fixedly supported so that the two center axes CA of the two circular-arc support surfaces 2a are in parallel with each other, and the two rollers 4 are arranged on the two circular-arc support surfaces 2a.

Further, according to the damping device of the third embodiment, copper plates 7 are erected on the support 2 opposite to the two swings 3 respectively while being individually spaced from the two swings 3, and six permanent magnets 8 are embedded on each of surfaces of the two swings 3 which confront the copper plates 7 (permanent magnets 8 of the deep side swing 3 are not shown in FIG. 9).

According to the tuned cradle type damping device of the third embodiment, operation and effects similar to those of the first and second embodiments can be obtained, and besides, swing-enabled distances of the two swings 3 can be increased even if the circular-arc support surfaces 2a are equal (not enlarged) in radius, thus improving damping effects more.

The description has been made based on the illustrated embodiments. However, the embodiments are not limitative of the present invention. For example, sizes and materials of the sections are not limited to those of the first embodiment, the circular-arc support surface 2a may be a lower half of a circle, and the constitutions of the support, swings, rollers and the like can be properly changed when necessary within the scope of the appended claims.

Thus, according to the tuned cradle type damping device of the present invention, it is possible to effectively protect the structure from vibration brought about by earthquakes, winds, vehicles or the like, and to maintain the device always operable with easy maintenance and inspection.

What is claimed is:

1. A tuned cradle type damping device, comprising:

a support having a first circular-arc support surface that is at least partially circular in shape, the first circular-arc support surface having a thickness dimension that extends in a direction of a center axis of the first circular-arc support surface;

two swings respectively positioned on opposite sides of the first circular-arc support surface outside of the thickness dimension of the first circular-arc support surface; and at least one roller rotatably supported on the first circular-arc support surface to be rolled thereon and moved around the center axis thereof, and both ends of the at least one roller are rotatably connected to the two swings to support the two swings, the at least one roller being between the two swings, wherein: copper plates are disposed on the support and placed opposite to the two swings, respectively, while being individually spaced from the two swings, and permanent magnets are disposed on surface of the two swings, directed to the copper plates.

2. The tuned cradle type damping device according to claim 1, wherein the support has a second circular-arc support surface having a thickness dimension that extends in a direction of a center axis of the second circular-arc support surface, with the center axes of each of the first circular-arc support surface and the second circular-arc support surface being in parallel with each other, the at least one roller includes two rollers which are respectively arranged on the first circular-arc support surface and the second circular-arc support surface.

\* \* \* \* \*